(12) United States Patent
Lemke et al.

(10) Patent No.: US 6,279,229 B1
(45) Date of Patent: Aug. 28, 2001

(54) METHOD FOR PRODUCING A HEAT SHIELD AND HEAT SHIELD PRODUCED BY THIS METHOD

(75) Inventors: Kai Lemke, Ulm; Bernd Bretschneider, Ichenhausen; Giaimi Giacomo, Ulm; Bruno Görlich, Weissenhorn; Dieter Grafl, Ulm, all of (DE)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/361,815

(22) Filed: Jul. 27, 1999

(30) Foreign Application Priority Data

Aug. 28, 1998 (DE) .............................. 198 39 237

(51) Int. Cl.[7] .................................................. B21D 33/00
(52) U.S. Cl. .................. 29/890.03; 29/428; 29/890.039; 29/17.4; 165/135; 428/68; 428/75; 428/76
(58) Field of Search ............................. 29/458, 890.039, 29/17.4, 428, 890.03; 165/41, 135; 428/68, 75, 76

(56) References Cited

U.S. PATENT DOCUMENTS

| 4,709,781 | * | 12/1987 | Scherzer | 181/290 |
| 4,996,095 | * | 2/1991 | Behdorf et al. | 428/215 |
| 5,385,790 | * | 1/1995 | Atkinson et al. | 428/593 |
| 5,901,428 | * | 5/1999 | Sheridan | 29/509 |
| 5,981,082 | * | 11/1999 | Pirchl | 428/603 |

FOREIGN PATENT DOCUMENTS

| 963 38 | 4/1957 | (DE) . |
| 38 34054 C2 | 4/1990 | (DE) . |
| 39 05871 C2 | 8/1990 | (DE) . |
| 58-181619 | * 10/1983 | (JP) . |
| WO 98/30416 | 7/1998 | (WO) . |

\* cited by examiner

*Primary Examiner*—Irene Cuda Rosenbaum
*Assistant Examiner*—John C. Hong
(74) *Attorney, Agent, or Firm*—Rader, Fishman & Grauer PLLC

(57) ABSTRACT

The present invention relates to a method of manufacturing a heat shield and to a heat shield manufactured with this method. Heat shields of this type are particularly used in the field of the automobile industry. According to the method according to the invention, an insulating material, performed in a suitable contour and consisting of graphite, for example vermiculite, without binding agent, is inserted as an insulating plate (4) between two flat materials (2, 3), consisting of sheet metal, for example. The flat materials (2, 3) are then connected to one another at their edges in a positive or non-positive manner. The insulating material is here compressed, before or after being deposited on the flat material, to form a coherent insulating plate.

12 Claims, 1 Drawing Sheet

METHOD FOR PRODUCING A HEAT SHIELD AND HEAT SHIELD PRODUCED BY THIS METHOD

FIELD OF THE INVENTION

The invention relates to a method for manufacturing a heat shield and a heat shield produced with this method.

BACKGROUND OF THE INVENTION

Heat shields of this type are used wherever temperature-sensitive assemblies, components or connection lines have to be protected in such a way that heat radiation cannot impact directly on them. This is especially the case with motor vehicles where hot parts of the drive assembly are arranged in direct spatial proximity to other temperature-sensitive assemblies.

The ever-improving utilisation of the engine compartments of motor vehicles leads to heat-sensitive components having to be arranged very close to very hot components, such as, for example, the exhaust system, the combustion engine or the heat exchangers. There is therefore a great need for heat shields particularly in the automobile industry.

From DE 38 34 054 C2 is known a heat shield, in which, in order to protect from heat radiation, at least two flat materials are used which are connected to one another on at least two edge regions turned away from one another. The flat materials mentioned are connected to one another in such a way that a gap is formed between them. Moreover, with this known heat shield it is important that the flat material facing the source of the heat radiation is so oriented in its expansion characteristic by pre-determined profiling or beading or corresponding choice of material that it expands towards the heat source. Through corresponding configuration, adaptation to the heat load arising should be made possible, since with higher temperatures the spacing of the two flat materials used, which preferably consist of sheet metal, is increased and an enlarged air gap is produced which naturally improves the insulation effect.

This heat shield can be further improved in relation to its insulating effect if a heat insulation layer is applied in addition to the inner surfaces of the flat materials proposed there. Specially suitable for this purpose are particularly organic or inorganic fibre materials, but also metallic woven fabrics, knitted fabrics or expanded metals (grids). These furthermore improve the sound insulation which is also obtained through these heat shields.

This heat shield has, however, the disadvantage that it is not possible for every conceivable contour of the heat shield to be configured, in order to achieve the desired effect for adaptation to the different temperatures. Moreover, the insulating effect is limited if only an air gap is used without additional heat-insulating materials.

However, where heat-insulating materials are used as the heat insulation layer, which are applied to the external plates of the heat shield, increased production and cost outlay must be reckoned with. Alternatively, the heat insulation layer may be inserted between the two external plates of a heat shield. For this purpose, however, the material to be inserted as the heat insulation layer has to be bonded by means of a binding agent. Binding agents of this kind generally have organic components which cause problems at high temperatures. In particular, the organic binding agents used for this purpose are both ecologically and toxicologically unsafe, since at the high temperatures occurring they give off gases or carry out chemical reactions.

From PCT/DE98/00065, therefore, is known a method for manufacturing a heat shield in which an insulating material in powder and/or flake form and free of binding agent is applied to one of the two flat materials formed as plates, and then compacted at least in regions through the effect of pressure. Then the second flat material, also configured as a plate, is laid on the insulating material and brought, for instance by folding, into a positive or non-positive connection with the lower flat material. What is advantageous about this method is that it is possible to do without the use of an ecologically or toxicologically unsafe binding agent. What is disadvantageous, however, is that the loose, pourable insulating material has to be applied exactly to the lower plate in the desired distribution. To this end it is necessary to apply the pourable material exactly to a component of the heat shield to be manufactured. This method of production is therefore expensive and cost-intensive.

Proceeding from the above, it is therefore the object of the present invention to quote a method and a heat shield manufactured with the method, which may be carried out or respectively manufactured simply and with low costs. In particular, the heat shield is intended to be safe from every toxicological and ecological point of view.

SUMMARY OF THE INVENTION

According to the invention, this object is achieved by the method according to the preamble of claim 1 and by the heat shield according to the preamble of claim 27 in conjunction with their respective characteristic features. Advantageous developments of the method according to the invention and of the heat shield according to the invention are given in the dependent claims.

According to the method of the invention, an insulating material in granular, powder and/or flake form, uncompacted or also compacted, is formed in the desired shape corresponding to the heat shield to be manufactured and then applied to one of the two external plates of the heat shield. Then the heat shield is provided with the other external plate and both external plates are connected to one another in a positive or non-positive manner. In this way, the application of suitable insulating material layers to an external plate is simplified and becomes more accurate.

The transfer of the preformed insulating material can be made, for example, through a suction apparatus. If the suction apparatus itself has a contour corresponding to the desired shape, the shape of the insulating material can be created by simple suction of the loose material. If one of the external plates is provided with apertures, it can be fastened to the suction apparatus, for example through suction or magnetically. Then the insulating plate made of loose or compacted material is sucked by the suction apparatus to the surface of the fastened external plate and applied together with the external plate to a second external plate.

If preformed, loose insulating material is applied to the external plate, said material can then be compacted by being pressed with the suction apparatus or another pressing plate, or even with the other external plate of the heat shield, against the first external plate.

Conveying the preformed insulating material to the external plate becomes particularly simple insofar as, before being conveyed, it is compacted into a coherent insulating plate and only then applied to one of the two external plates of a heat shield to be manufactured. This compacted, coherent insulating plate has a certain inherent stability which makes it possible for it to be conveyed. Thereafter the second external plate is laid onto the insulating plate and connected with the other external plate to form the composite according to the invention comprising two external plates with a central insulation layer as a heat shield.

What is advantageous about the method according to the invention is that the insulating material does not have to have any binding agent. Thus no ecological or toxicological reservations arise against a heat shield of this type. Altogether, the low binding forces between the individual grains of the compacted insulating material result furthermore in improved sound insulation and smaller resonance problems in the heat shield according to the invention.

Through compacting the insulating material by a factor of up to 20, preferably by a factor of 5 to 10, to form a coherent insulating plate, sufficient inherent strength of the insulating plate is produced such that it may be conveyed, for example with a flat suction apparatus provided with a perforated plate. In terms of production techniques, this results in the advantage that the insulating material can be brought into the desired shape with the desired thickness or distribution of density or thickness, independently of the overall assembly of the heat shield. Furthermore, simple reutilisation of any insulating material becoming surplus during compaction is possible.

The compaction can be effected by means of rollers/calendering, then transfer of the insulating plate to a belt, stamping/punching of the insulating plate into the desired shape and transfer to the suction apparatus serving as the conveying means. Alternatively, a plate can be pressed, stamped/punched and transferred to the suction apparatus.

The compaction can also be effected through a single cycle of pressing an evenly thick insulating material layer or an insulating material layer already contoured with different appropriate thicknesses, or also in a plurality of pressing cycles with additional application of insulating material—locally limited even—taking place between the individual pressing cycles.

Compaction can also occur in such a way that the insulating material is only compacted in some regions, and in the non-compacted regions the insulating material is then removed, for example blown or sucked away. In this way, any types of structures can be produced, for example with holes for screws etc. Moreover, the compaction of the material can be controlled in such a way that bulges/projections, apertures, beads and/or webs can be deliberately produced in/on the surfaces of a tool used for the compaction. Bulges and beads or webs of this kind can be used to stabilise the heat shield, for local intensification of the screening effect or to save material in regions with a low heat load.

A preformed and compacted insulating plate can also be conveyed by means of a belt to the first external plate and deposited on same. This can for example come about in that, at the end of the belt, the belt is drawn away downwards from the coherent insulating plate, for example over a belt deflection roller and the insulating plate is pushed over the end of the belt onto the external plate. The insulating plate can here be created on the belt by, for example, non-expanded insulating material such as vermiculite being deposited on the belt, shaped, heated and expanded on the belt, and pressed simultaneously or subsequently.

Suitable as loose insulating material are especially mica, expanded mica, non-expanded graphite, expanded graphite, perlite or mica decomposition products such as vermiculite or expanded vermiculite. Non-expanded insulating material, for example non-expanded graphite or non-expanded vermiculite, can be thus applied to a pressing plate, heated by means of the pressing plate and expanded in this process. To this end, the plate is preheated or is heated after the application of the material, for example to 250° C., preferably 300° C., or higher. The compaction can also take place during the heating of the insulating material or subsequently thereto. One of the external plates of the heat shield can also serve as a pressing plate during the application of an insulating plate made of loose insulating material.

As an alternative to applying the insulating material to a pressing plate and then compacting the material, it is also possible to create the insulating material as a loose layer and to receive it as a loose layer from a flat suction apparatus, for example in the form of a perforated plate. Thereafter, the suction apparatus can be conveyed to a further flat plate and the loose layers be compacted there in the external shape, predetermined for example by the suction apparatus, to form an insulating plate and then be applied to one of the external plates of the heat shield.

Particularly suitable as insulating material for the method described above are mica, expanded mica, non-expanded graphite, expanded graphite, perlite or mica decomposition products, such as vermiculite or expanded vermiculite, for example. Advantageously, the latter has a particle size of up to 10 mm, preferably between 1 and 3 mm. The insulating material can here also have finer portions. The insulating material used to manufacture the insulating plates can also contain further additives such as inorganic fibres. Additives of this type can improve the strength of the insulating plate. Particularly suitable for this purpose are inorganic fibres, preferably with a non-respirable diameter of >5 µm, for example glass fibres or mineral fibres. These are also ecologically and toxicologically safe.

The heat shield manufactured according to this method can be shaped three-dimensionally after the connection of the two external plates, for example by flanging, folding etc. This makes possible adaptation to the steric conditions at the place of installation, for example in the engine compartment. Since the insulating material used only has low forces between individual grains, the latter slide easily past one another, such that the heat shield is easy to deform even after connection of the external plates and the insulating plate.

Some embodiments of the method according to the invention and of the heat shield according to the invention are described below.

DETAILED DESCRIPTION OF THE INVENTION

Figure 1:
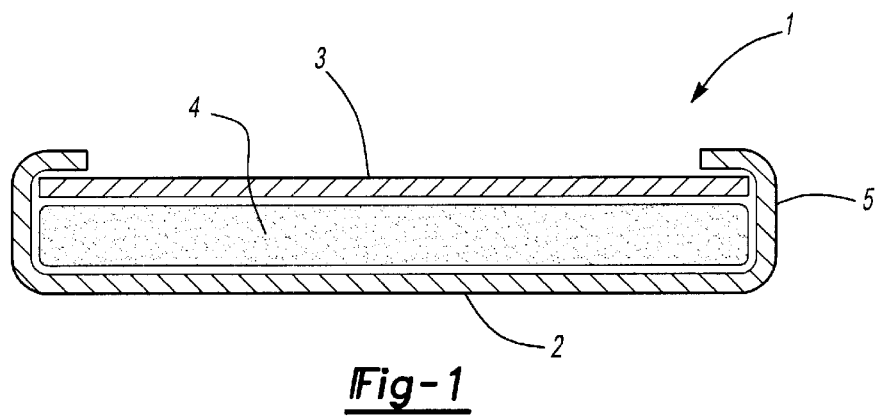
FIG. 1 a heat shield according to the invention.

FIG. 1 shows a heat shield 1 according to the invention. This shield consists of a lower external plate 2 and an upper external plate 3. The two external plates 2 and are securely connected to one another in the edge region 5 by the outer edge of external plate 2 being flanged over the outer edge of external plate 3. Between the two external plates 2 and 3 there is a plate 4 made of the insulating material vermiculite with a particle size of approx. 1 to 3 mm.

Figure 3:
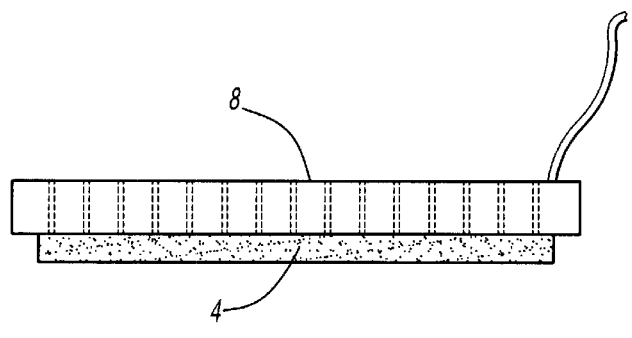
FIG. 3 a schematic of a section apparatus applying the insulating material.

The heat shield 1 represented in FIG. 1 was manufactured by expanded vermiculite with a particle size of 1 to 3 mm being applied as an uncompacted insulating material layer with a thickness of between 5 and 7 mm to a plate formed in the desired contour. Metering of the material was effected via a doctor blade system with a slotted hole hopper. This can also happen with a conveyor belt/brush system or by means of a metering roller with a brush surface. Excess material dropped past the plate. Then the vermiculite was compacted by a factor of 8. Thus an insulating plate 4 is produced which has sufficient inherent stability to be picked up by means of a flat suction apparatus 8 designed as a perforated plate and to be laid on a flat sheet metal plate 2 with larger external dimensions than the insulating plate 4. A schematic of the section apparatus 8 is shown in FIG. 3. Then a further flat plate 2 with the dimensions of the insulating plate is laid on the insulating plate 4. The lower plate 2 serves as the lower external plate 2 and is then folded around the edge of the upper plate acting as the upper external plate 3.

Figure 2:
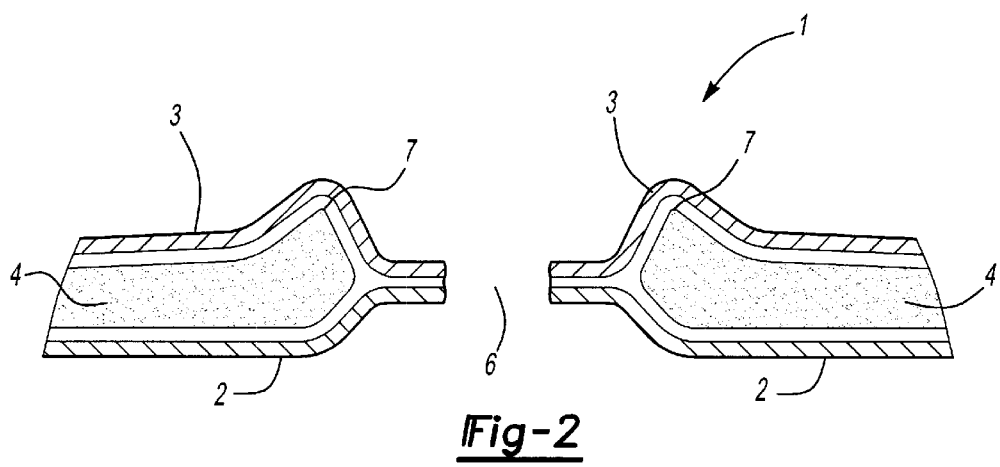
FIG. 2 an additional heat shield according to the invention.

FIG. 2 shows a further heat shield 1 according to the invention. Corresponding elements of the heat shield 1 are here designated with corresponding reference numbers as in FIG. 1. A lower external plate 2 and an upper external plate enclose an insulating plate 4. The lower external plate 2 and the upper external plate 3 are guided together in region 6, in which a bore is provided, through which for example a screw can be led, in the lower external plate 2 and the upper external plate 3. In the regions 7 adjoining this region 6, the upper external plate 3 is arched, such that a locally enlarged spacing is produced there between the two external plates 2 and 3. In this region 7, the insulating plate 4 is correspondingly of greater thickness. This material accumulation in region 7 causes substantially increased heat and sound insulation in the region 7 surrounding the through hole in region 6. This is particularly advantageous because the heat and sound insulation is reduced in region 6 as a result of the lacking insulating material and therefore compensation is produced in the directly adjoining region 7.

The procedure for the manufacture of this heat shield 1 is such that first of all the two external plates 2 and 3 with the corresponding through hole in region 6 are manufactured. The external plates 2 and 3 are here already formed to correspond with their final shape including the bulges in region 7. Then an insulating plate made of vermiculite with a particle size of 1 to 3 mm is compacted by a factor of 5. The compaction comes about through pressing in a mould such that the vermiculite plate 4 already has the shape represented in FIG. 2 with the thickening in region 7 and the recess in region 6. This plate 4 is then picked up by a suction apparatus 8 configured as a perforated plate and laid onto the external plate 2 in the correct position. Then the upper external plate 3 is laid on the insulating plate 4 and connected to the lower external plate 2 in the manner described for FIG. 1.

In order subsequently to clean loose and excess vermiculite from the suction apparatus 8, the latter is operated for a short time with excess pressure and thus the adhering vermiculite is blown away.

What is claimed is:

1. A method for manufacturing a heat shield to be used in motor vehicles, comprising:

providing at least first and second external plates;

pre-forming and compacting an insulating material that is one of a granular, powder and flake form and free of binding agent into a predetermined contour;

applying said insulating material to one of said first and second external plates so as to at least partially cover said one external plate;

positioning said other of said first and second external plates adjacent to said insulating material such that said insulating material is positioned between said first and second external plates; and connecting said first and second external plates together to capture said insulating material therebetween.

2. The method for manufacturing a heat shield according to claim 1, wherein said pre-formed and compacted insulating material is transferred to said one of said first and second external plate by a suction apparatus.

3. The method for manufacturing a heat shield according to claim 1, wherein said insulating material is pre-formed and compacted by a suction apparatus having said predetermined contour and then said suction apparatus applies said preformed and compacted insulating material to said one of said first and second-external plate.

4. The method for manufacturing a heat shield according to claim 3, wherein said one of said external plates is selectively and removably fastened to said suction apparatus such that said insulating material is biased onto a surface of said one of said first and second external plates.

5. The method for manufacturing a heat shield according to claim 1, wherein said pre-formed insulating material is compacted into a insulating plate before being applied to said one of said first and second external plates.

6. The method for manufacturing a heat shield according to claim 5, wherein said compacted pre-formed insulating material is stamped into a predetermined shape before being transferred to said one of said external plates.

7. The method for manufacturing a heat shield according to claim 5, wherein said pre-formed insulating material has a predetermined contour with varying localized thickness and is compacted into said insulating material layer in at least one pressing cycle.

8. The method for manufacturing a heat shield according to claim 7, wherein additional amounts of insulating material are selectively added to said pre-formed insulating material between said pressing cycles.

9. The method for manufacturing a heat shield according to claim 1, wherein said preformed and compacted insulating material is selectively compacted in predetermined regions to produce local stabilization of said heat shield, wherein non-compacted material is removed from said one of said first and second external plates.

10. The method for manufacturing a heat shield according to claim 1, wherein said preformed and compacted insulating material is heated after being applied to said one of said external plates.

11. The method for manufacturing a heat shield according to claim 1, wherein said at least first and second external plates are connected together by folding a flange portion of one of said external plates over the other of said external plates.

12. The method for manufacturing a heat shield according to claim 1, wherein said heat shield is selectively shaped three-dimensionally after said external plates are connected together.

* * * * *